(12) United States Patent
Barkley et al.

(10) Patent No.: US 8,005,470 B2
(45) Date of Patent: *Aug. 23, 2011

(54) HIGH-SPEED INTERNAL WIRELESS BUS

(75) Inventors: Warren V. Barkley, Mill Creek, WA (US); Adrian M. Chandley, Mill Creek, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

This patent is subject to a terminal disclaimer.

(21) Appl. No.: 11/847,288

(22) Filed: Aug. 29, 2007

(65) Prior Publication Data

US 2008/0102755 A1 May 1, 2008

Related U.S. Application Data

(63) Continuation-in-part of application No. 11/069,881, filed on Feb. 28, 2005, now Pat. No. 7,548,749.

(51) Int. Cl.
*H04M 3/00* (2006.01)
(52) U.S. Cl. ....... 455/420; 455/41.2; 455/502; 710/305; 710/62; 710/29; 710/301; 375/219; 345/531; 709/212; 709/215; 709/216
(58) Field of Classification Search ............ 455/41.2, 455/553, 556, 557, 466, 552, 412, 456.1, 455/419, 420, 502; 710/305, 62, 29, 301; 375/219; 709/228, 200, 212, 215, 216; 345/531
See application file for complete search history.

(56) References Cited

U.S. PATENT DOCUMENTS

| | | | |
|---|---|---|---|
| 6,442,661 B1 | 8/2002 | Dreszer | |
| 6,529,743 B1* | 3/2003 | Thompson et al. | 455/557 |
| 6,633,759 B1* | 10/2003 | Kobayashi | 455/419 |
| 6,779,069 B1* | 8/2004 | Treichler et al. | 710/305 |
| 7,164,886 B2* | 1/2007 | Mowery et al. | 455/41.2 |
| 7,206,559 B2 | 4/2007 | Meade, II | |
| 7,523,209 B1* | 4/2009 | Treichler et al. | 709/228 |
| 7,533,141 B2* | 5/2009 | Nadgir et al. | 709/200 |
| 7,548,749 B2* | 6/2009 | Barkley et al. | 455/420 |
| 7,746,349 B1* | 6/2010 | Rao et al. | 345/531 |
| 2002/0164997 A1* | 11/2002 | Parry | 455/456 |
| 2004/0148326 A1* | 7/2004 | Nadgir et al. | 709/200 |
| 2006/0194539 A1 | 8/2006 | Barkley et al. | |
| 2008/0052436 A1* | 2/2008 | Sharma et al. | 710/301 |

FOREIGN PATENT DOCUMENTS

EP 1 494 432 1/2005

OTHER PUBLICATIONS

European Search Report for European Patent Application No. 06100718.3, Microsoft Corporation, Jul. 5, 2006.
Hyper Transport Consortium, "HyperTransport I/O Technology Overview, An Optimized, Low-latency Board-level Architecture," The HyperTransport Consortium, www.hypertransport.com, Jun. 2004.

\* cited by examiner

*Primary Examiner* — Temesgh Ghebretinsae
*Assistant Examiner* — April G Gonzales
(74) *Attorney, Agent, or Firm* — Perkins Coie LLP

(57) ABSTRACT

Multiple computing devices are connected together using a high-speed wireless link. The wireless link enables expansion of available resources to the host device, such as one or more of volatile memory resources, non-volatile memory resources, and additional processor resources.

20 Claims, 8 Drawing Sheets

HIGH-SPEED INTERNAL WIRELESS BUS

CROSS-REFERENCE TO RELATED APPLICATIONS

This application is a Continuation-in-Part of U.S. patent application Ser. No. 11/069,881, filed Feb. 28, 2005, now U.S. Pat. No. 7,548,749 issued Jun. 16, 2009, and entitled HIGH-SPEED INTERNAL WIRELESS BUS, which is incorporated herein by reference.

FIELD OF THE INVENTION

This invention pertains generally to the art and science of connectivity among computing devices. More particularly, the invention relates to a method and system that enables two or more computing devices to be connected together through a high-speed wireless bus.

BACKGROUND

The digital revolution ushered in by widely available computing devices is now well under way, and a secondary wave is now occurring. The secondary wave involves enhanced interconnectivity of various available computing devices, as users require increased mobility and/or less cluttered experience. For example, a traditional desktop PC can provide a great deal of utility. However the user is typically tethered in place by the size of the machine as well as its various wired connections.

Many handheld and smaller profile computing devices currently provide substantial computing power and flexibility to their users. Such flexibility is achieved through connection to various services in a wireless manner, thus allowing freedom of movement. For example, cell phones, personal digital assistants, notebook computers and other devices can communicate wirelessly and are portable. For this reason, they are gaining widespread acceptance, particularly when mobility is of greater importance.

However, portable devices, by the their nature, often lack sufficient computing power and memory resources to run complex applications in various environments. For example, portable devices often cannot be utilized to run customer resource management (CRM) and other business applications that require a great deal of computing resources to perform adequate front-end processing to present rich environments which users customarily expect. Other applications present multi-media environments and/or rely on processor-intensive operations. Such applications cannot now be executed by portable devices due to expanded input and output requirements, such as video and/or audio, or multi-monitor usage. Therefore, there is a need to examine new ways for users of portable and other devices to experience such rich application environments.

SUMMARY

The following presents a simplified summary of the disclosure in order to provide a basic understanding to the reader. This summary is not an exclusive or limiting overview of the disclosure. The summary is not provided to identify key and/or critical elements of the invention, delineate the scope of the invention, or limit the scope of the invention in any way. Its sole purpose is to present some of the concepts disclosed in a simplified form, as an introduction to the more detailed description that is presented later.

Embodiments of the invention solve the shortcomings inherent in prior techniques by enabling connection at least two computing devices through a high-speed wireless link. In an embodiment of the invention, the resources of the devices may be shared so that, when so connected, the devices appear to the user as a single logical computing entity.

In an embodiment of the invention, a mobile host computing device is connected to a stationary host computing device using a high-speed wireless link. Such a link may be established with a high-speed wireless bus that connects to a front-side bus of the respective central processing unit (CPU) for each device. This enables extension of certain computing resources, such as one or more of volatile memory resources, non-volatile memory resources, and the host processor. The wireless link is invisible to the higher layers of the operating system and the user. In this way, the host appears to the user as a logical host that contains available resources of multiple physical devices.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION

Generally, the invention relates to connectivity between at least two computing devices using a high-speed wireless link. In an embodiment of the invention, the wireless link enables access to available resources of the computing devices, such as one or more of volatile memory resources, non-volatile memory resources, and the host processor. In a preferred embodiment, the high-speed wireless link is invisible to the higher layers of the operating system and the user. In this way, the host computing device appears to contain available resources of multiple physical devices.

As used herein, the term "high-speed connection" refers to a connection, preferably a wireless connection, having a sufficient bandwidth to accommodate data transfer rates that enable interface with a processor located on a computing device. For example, that term may refer to a wireless connection to a front-side bus of a computing device.

Figure 1:
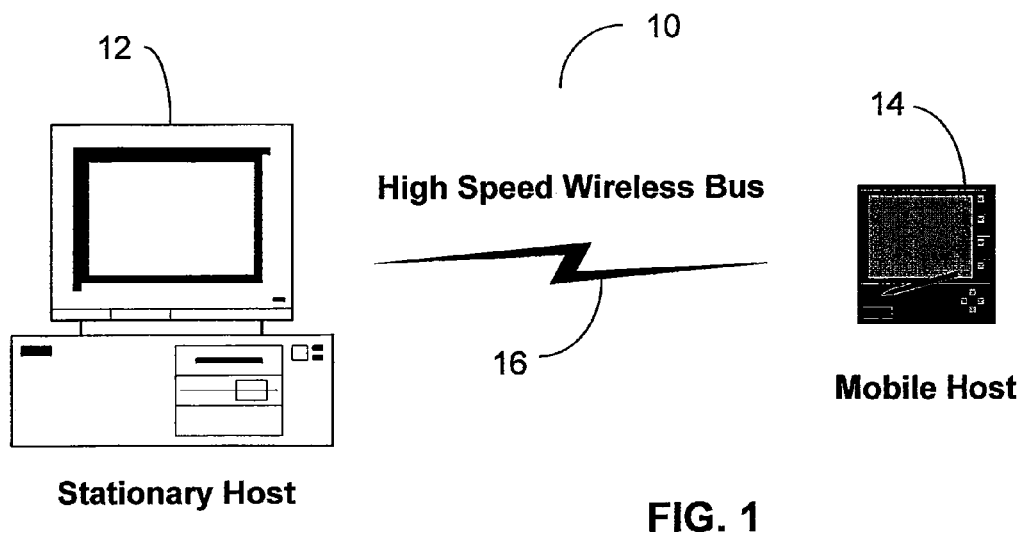
FIG. 1 is a schematic diagram of two computing devices within which embodiments of the invention may be implemented.

FIG. 1 illustrates one embodiment of the invention. This embodiment establishes a single logical host computing entity 10 from a stationary host computing device 12 and a mobile host computing device 14. In FIG. 1, the stationary computing device 12 is illustrated as a desktop PC. The mobile host 14 is illustrated as a pen-based mobile computing device. However, those skilled in the art should recognize that the computing devices may be implemented in any fashion.

When the devices are located in relatively close proximity, the mobile host 14 establishes a wireless bridge connection with the stationary host 12 through a high-speed wireless link 16. As explained in further detail below, the wireless link 16 is preferably achieved through the Ultra Wideband (UWB) wireless communication technology, due to the amount of bandwidth available through this medium. While UWB is the currently preferred implementation, it be appreciated that the techniques described herein are useable with respect to devices implementing other communications technologies as well. Indeed, it is contemplated that later-developed wireless communication technologies, having superior performance characteristics, will emerge in the future. Such later-developed technologies should be considered as the same or structural equivalents to the UWB communication technology disclosed and claimed herein.

As explained below, the high-speed wireless link 16 shown in FIG. 1 bridges the front-side or equivalent busses of the respective computing devices. In this way, one of the devices may access critical resources of the other device, such as its processor, volatile memory, and non-volatile memory. In this way, the wireless bridge provides a virtual back-plane that enables ready access to the available resources of the computing devices.

In a preferred embodiment, after the high-speed wireless link is established, the operating system of one of the host devices, such as the mobile host 14, determines the available resources of the connected devices. Such available resources are then expanded to the mobile host device 14 to create a logical host having expanded processing power and/or memory capability. In this embodiment, the operating system for the mobile host performs such tasks as memory management of the expanded logical host, fragmenting the assignment of work between the processors, management of bandwidth issues between the processors and memory resources, and similar tasks. In this embodiment, the front-side busses and wireless connection appear to the operating system of the mobile host as a single virtual entity.

In an alternative embodiment, after it obtains knowledge of the connection and of the presence of additional resources, the operating system for the mobile host allocates resources by accounting for wireless channel bandwidth considerations. In this embodiment, the mobile host operating system may optimize scheduling of available resources based on the bandwidth limitations of the wireless channel. The operating system may include functionality for balancing the bandwidth limitations of the wireless channel with resource availability. For example, certain tasks may be more efficiently performed by the mobile host processor due to the wireless connection bandwidth. Alternatively, depending on file size and resources available to transmit data between the mobile and stationary host computers, the stationary host computer processor may be better equipped to handle processor-intensive tasks, such as generation of bit-mapped images or the like.

Figure 2:
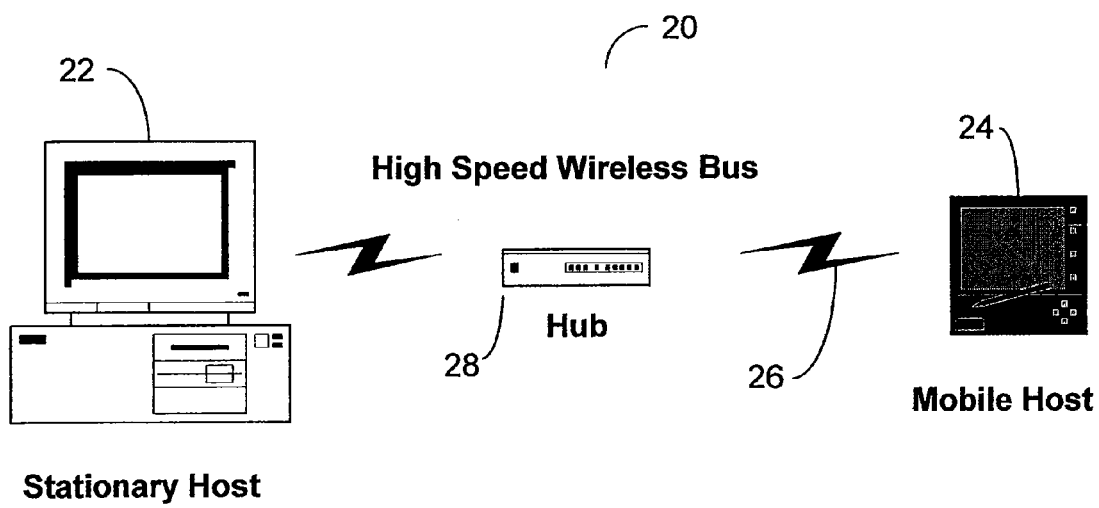
FIG. 2 is a schematic diagram of alternative embodiment in which multiple computing devices are linked through a hub according to the invention.

FIG. 2 shows an alternative embodiment of the invention. In this embodiment, a first computing device, shown as a stationary host PC 22, is connected to a mobile host computing device 24. In this embodiment, a high-speed wireless link 26 is established between the computing devices 22, 24 via a hub 28. The hub 28 provides an access point that operates to coordinate the high-speed wireless connection by managing data traffic between the computing devices 22, 24. This arrangement is particularly advantageous when other UWB devices such as wireless monitors, printers and other peripheral equipment exist in proximity to the location of the hub 28. Once the wireless communication bridge is established, the operation is the same as explained above in conjunction with FIG. 1.

As noted above, the presently preferred embodiments of the invention are described herein by reference to the UWB wireless communication technology. UWB is sometimes alternatively referred to as impulse, baseband or zero-carrier technology. UWB is a wireless communications technology that transmits very short ultra-low power radio signals across a wide frequency spectrum. UWB receivers can translate the received burst by recognizing a particular pulse sequence sent by the transmitter. The FCC has defined UWB to include any signal that occupies more than 500 MHz or that has more than 20% fractional bandwidth, in the 3.1 GHz to 10.6 GHz band. The bandwidth of a UWB signal is typically about 25% of the center frequency. For example, a "2 GHz" UWB signal may have a bandwidth of 500 MHz.

The spectrum allowed for UWB is 7500 MHz. This is substantially greater than the spectrum for other technologies currently in use. For example, ISM at 2.4 GHz encompasses an 83.5 MHz spectrum, while U-NI at 5 GHZ takes up 300 MHz (to be increased to 555 MHz).

The power of a UWB signal is typically low. For example, a UWB signal may be on the order of 1000 times lower than that currently used for Wi-Fi RF transmissions. The low power requirement is achieved through the ease in which UWB signals are detected, i.e. the ease with which the signal may be extracted from background noise.

The modulation technique used for UWB is typically binary phase-shift keying (BPSK). In BPSK, each pulse is sent at zero or 180 degrees, i.e., right side up or inverted. Thus, BPSK modulation is efficient in its use of the spectrum, requiring about half the bandwidth of a comparable pulse position modulation system.

There are two approaches for UWB currently proposed, namely a single band approach and a multi-band approach. The single band approach proposes use of the entire 7.5 GHz spectrum as one carrier. The multi-band approach segments the 7.5 GHz into equal channels. The basic premise is that multiple frequency bands efficiently utilize the UWB spectrum by transmitting multiple UWB signals at the same time. The signals do not interfere with each other because they operate at different frequencies within the UWB spectrum. Each of these signals can be transmitted simultaneously to achieve a very high data rate or can be used as a means of multiple access to allow multiple users to communicate at the same time. Several standard digital modulation techniques can be on each individual UWB signal. The output of the modulated UWB signals can be added together before transmission.

A multi-band UWB system design has a number of advantages including: more scalable and adaptive than single band designs; better co-existence characteristics with systems such as 802.11a; and lower risk implementations because it leverages more traditional radio design techniques. These advantages can be retained while maintaining similar complexity and power consumption levels as single band designs.

With respect to being scalable and adaptive, an advantage of the multi-band approach is that, for example, low bit rate systems can use few bands, high bit rate systems can use many bands. Another advantage is to be potentially adaptive to different radio regulations worldwide, in the event that they do not have the same harmonized spectrum allocations, as happened for the 2.4 GHz and 5 GHz bands used by WiFi and Bluetooth.

With respect to co-existence, another advantage of the multi-band approach is to increase the level of coexistence with other services such as IEEE 802.11a. A receiver can dynamically adjust the in-band interference by removing the affected band, or a transmitter can avoid transmitting in a band already used by another service in close proximity.

Finally, since the multi-band technique is based on well known wireless communications scheme, modified for use with the UWB spectrum, the technology presents lower implementation risk. This makes multi-band the best candidate for commercial applications that require standards technology and multiple vendors for high volume adoption.

Multi-band systems permit adaptive selection of the bands to provide good interference robustness and co-existence properties. When the system detects the presence of an 802.11a system, for example, it can avoid the use of the bands centered at 5.35 GHz or 5.85 GHz. This same feature can also be utilized to provision for different spectrum allocations outside of the United States; the bands that share the spectrum with extremely sensitive systems can be avoided.

A single band UWB system would need to employ notch filters to achieve the same result. Notch filters are not an ideal solution because they either increase the receiver's noise figure or require higher performance Low Noise Amplifiers. The problem with notch filters is that they are not adaptive and need to be realized with off-chip dedicated hardware. In addition, notch filters in most cases distort the receive pulse and require additional complexity to compensate for this effect.

The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 3:
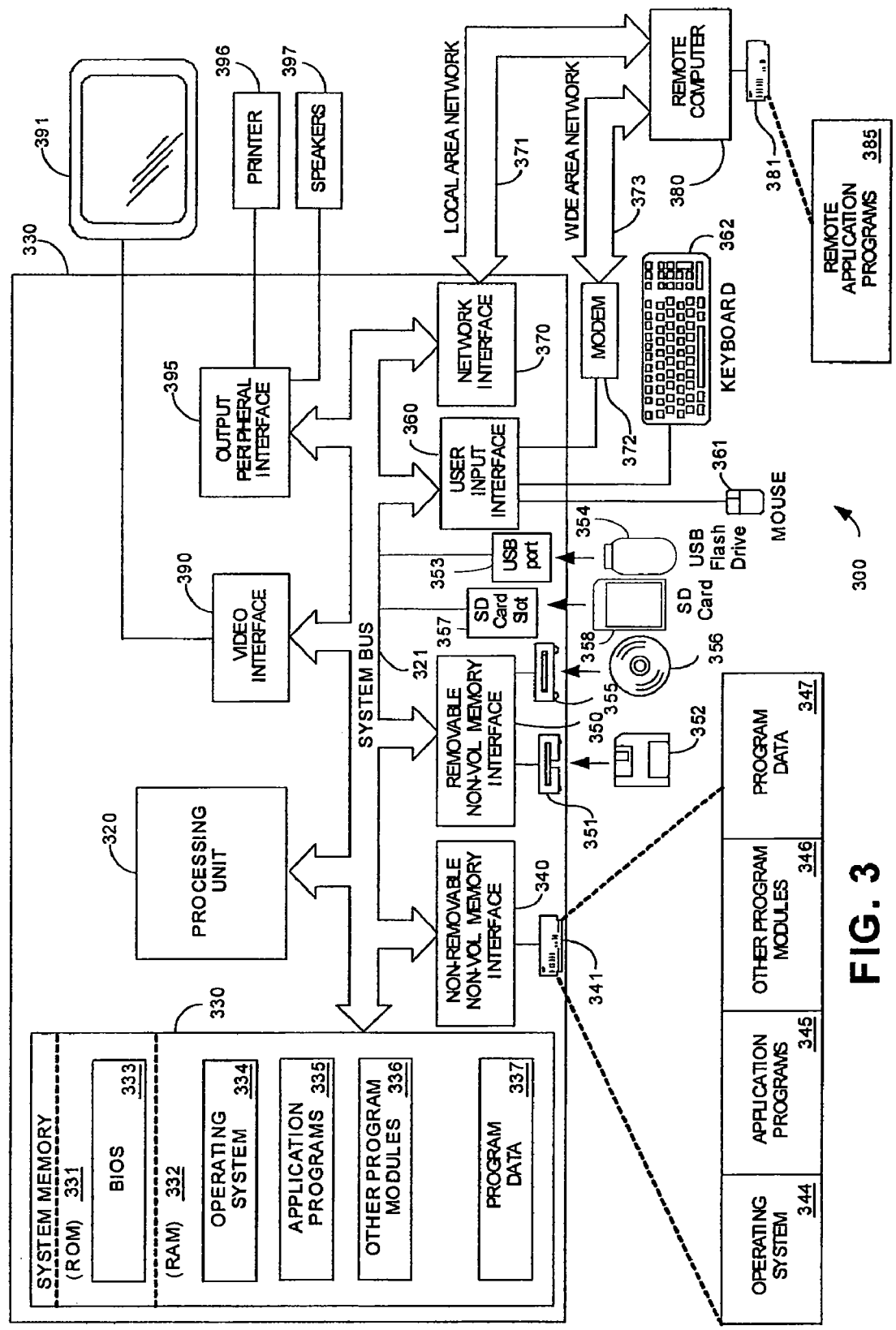
FIG. 3 is a schematic diagram illustrating an exemplary generalized computer networking environment suitable for incorporating embodiments of the invention.

FIG. 3 illustrates an example of a suitable computing system environment 300 in which the invention may be implemented. The computing system environment 300 is only one example of a suitable computing environment and is not intended to suggest any limitation as to the scope of use or functionality of the invention. Nor should the computing environment 300 be interpreted as having any dependency or requirement relating to any one or combination of components illustrated in the exemplary operating environment 300. Although at least one embodiment of the invention does include each component illustrated in the exemplary operating environment 300, another more typical embodiment of the invention excludes some or all non-essential components, for example, input/output devices other than those required for network communications.

One example system for implementing the invention includes a general purpose computing device in the form of a computer 310. Components of the computer 310 may include, but are not limited to, a processing unit 320, a system memory 330, and a system bus 321 that couples various system components including the system memory to the processing unit 320. As explained in greater detail below, the system bus 321 may be any of several types of bus structures including a memory bus or memory controller, a peripheral bus, and a local bus using any of a variety of bus architectures.

The computer 310 typically includes a variety of computer-readable media. Computer-readable media can be any available media that can be accessed by the computer 310 and include both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, or magnetic storage devices, or any other medium which can be used to store the desired information and which can be accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 330 includes computer storage media in the form of volatile and/or nonvolatile memory such as read only memory (ROM) 331 and random access memory (RAM) 332. By way of example, and not limitation, FIG. 3 illustrates operating system 334, application programs 335, other program modules 336 and program data 337.

The computer 310 may also include other removable and non-removable, volatile and nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The computer system may include interfaces for additional types of removable non-volatile storage devices. For instance, the computer may have a USB port 353 that can accept a USB flash drive (UFD) 354, or a SD card slot 357 that can accept a Secure Digital (SD) memory card 358. A USB flash drive is a flash memory device that is fitted with a USB connector that can be inserted into a USB port on various computing devices. A SD memory card is a stamp-sized flash memory device. Both the USB flash drive and SD card offer high storage capacity in a small package and high data transfer rates. Other types of removable storage media may also be used for implementing the invention.

The drives and their associated computer storage media, discussed above and illustrated in FIG. 3, provide storage of computer-readable instructions, data structures, program modules and other data for the computer 310. In FIG. 3, for example, hard disk drive 341 is illustrated as storing an operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a keyboard 362 and pointing device 361, commonly referred to as a mouse, trackball or touch pad. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 by way of an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 397 and printer 396, which may be connected through an output peripheral interface 395 or the like.

The computer 310 preferably operates or is adaptable to operate in a networked environment using logical connections to one or more remote computers, such as a remote computer 380. The remote computer 380 may be a personal computer, a server, a router, a peer device or other network node, and typically includes some or all of the elements described above relative to the computer 310, although only a memory storage device 381 has been illustrated in FIG. 3. The logical connections depicted in FIG. 3 include a LAN 371 and a WAN 373, but may also include other networks. For example, in the present invention, the computer 310 may comprise the source machine from which data is being migrated, and the remote computer 380 may comprise the destination machine, e.g., a thin client device. Note however that source and destination machines need not be initially connected by a network or otherwise, but instead, data may be migrated by way of any media capable of being written by the source platform and read by the destination platform or platforms. For example, one non-limiting instance of such a medium is a portable flash memory medium.

When used in a LAN environment, the computer 310 is connectable to the LAN 371 through a network interface or adapter 370. The computer 310 may also include a modem 372 or other means for establishing communications over the WAN 373. The modem 372, which may be internal or external, may be connected to the system bus 321 by way of the user input interface 360 or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4:
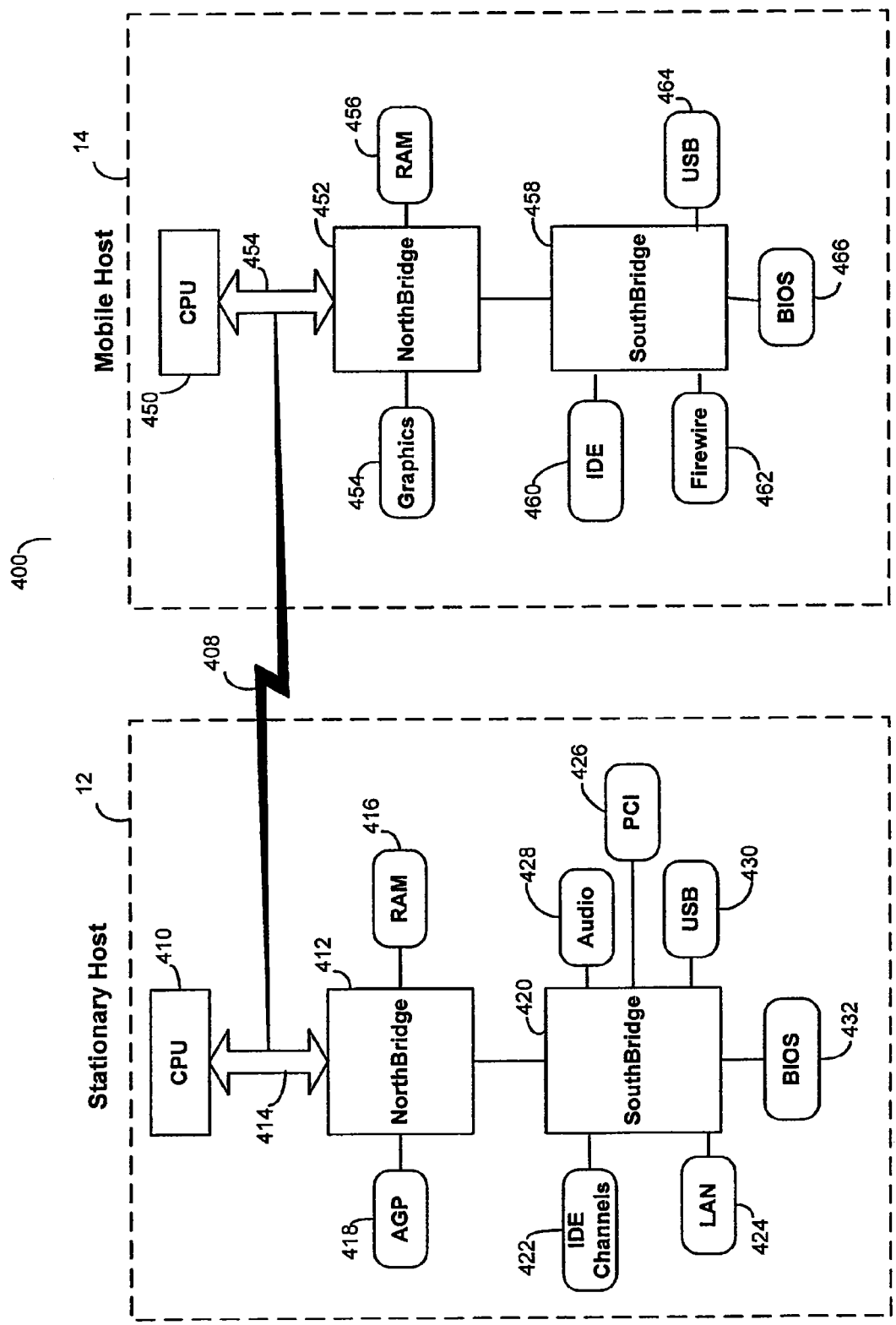
FIG. 4 is a hardware schematic diagram illustrating connection of two computing devices through a front-side bus of the respective devices.

While FIG. 3 shows the details of a computing environment generally, FIG. 4 is a simplified block diagram of certain hardware components that are typically located on the motherboard of a conventional PC or similar computing device. In the embodiment shown in FIG. 4, the Stationary Host 12 includes a CPU 410 that is connected with a NorthBridge Integrated Circuit 412 via a front-side bus 414. The NorthBridge 412 typically handles mission critical tasks, such as dealing with requests for data transfer to and from a RAM 416 as well as data transfer between the CPU and an accelerated graphics port, or AGP 418. Thus, the NorthBridge 412 includes a memory controller and associated hardware to efficiently manage the movement of data between the processor, the memory modules and the AGP.

The front-side bus 414 operates at a relatively high clock speed to enable CPU access to the various resources of the system without remaining idle as data is transferred. For example, the front-side bus 414 may operate at speeds of 800 MHz, which translates to a peak data bandwidth requirement of 4.2 GB/sec. For this reason, the currently preferred embodiment of the invention employs UWB technology. However, as other high-speed wireless technologies are developed, they may likewise be utilized in the present invention.

In addition managing data transfer between the CPU and RAM, the NorthBridge 412 receives and transmits data with a SouthBridge IC 420 via a high speed link therebetween. The SouthBridge functions to provide support for a variety of input and output devices, which typically have differing bus speeds and designs. For example, the SouthBridge communicates with Interface Drive Electronics 422 for providing access to mass storage devices.

The SouthBridge may be coupled with a LAN interface 424. Further, the Southbridge is connected to a Peripheral Component Interconnect (PCI) bus 426 to permit expansion cards to be added to the stationary host. The SouthBridge 420 may further support audio output 428 as well as serial ports 430. Finally, the SouthBridge 420 provides an interface to BIOS software 432. However, because it does not perform the critical tasks of the NorthBridge, the SouthBridge does not require the data transfer rates of the NorthBridge.

The Mobile Host 14 may be similarly configured, as shown in the embodiment of FIG. 4. As with the Stationary Host, the Mobile Host 14 includes a CPU 450 connected to a NorthBridge IC 452 via a front-side bus 454. The NorthBridge 452 likewise provides a high-speed interface to a graphics port 454, and to RAM 456. As with the stationary host, the NorthBridge 452 is connected with a SouthBridge 458 via a high-speed connection. The SouthBridge 458 permits various internal and external peripheral components, such as an IDE 460, Firewire port 462 and a USB port 464. Finally, the SouthBridge 458 is coupled with flash memory in which a BIOS 466 is located. In the embodiment shown, the Mobile Host 14 contains fewer peripheral components than that of the Stationary Host. Those skilled in the art will appreciate that any of a number of configurations are possible.

While the embodiment described in connection with FIG. 4 utilizes a front-side bus architecture, those skilled in the art will appreciate that the invention may be implemented in conjunction with other board-level architectures. For example, the invention may alternatively be implemented to connect to board architectures that use HyperTransport™ links via a high speed wireless connection. In this embodiment, at least one of the computing devices is designed with HyperTransport technology operating as a fully integrated front-side bus, such as is generally shown in FIG. 3. In this embodiment, the NorthBridge-SouthBridge structure is eliminated.

Figure 5:
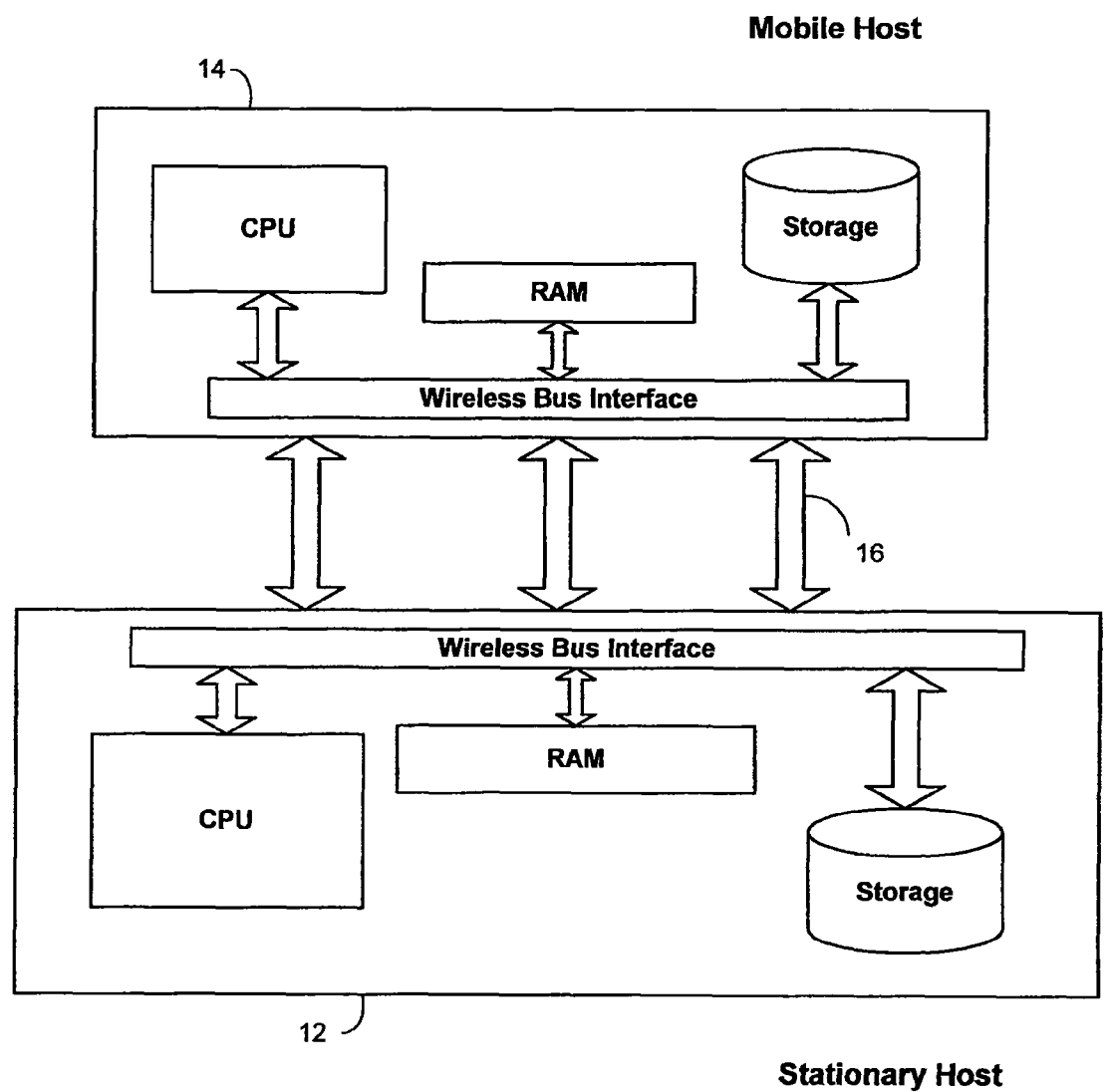
FIG. 5 is a schematic diagram conceptually illustrating connection of two computing devices through a high-speed wireless link.

FIG. 5 illustrates certain features of the invention at a more conceptual level. As shown, the high-speed wireless bus 16 forms a wireless bridge between the Stationary Host computing device 12 and the Mobile Host computing device 14. Such devices expose respective wireless bus interfaces, which permit access to their critical or essential resources. Thus, for example, the critical resources of the Stationary Host 12 are made available to the Mobile Host 14. As used herein, such "critical resources" refer to any of the Stationary Host processor, RAM and non-volatile storage. Similarly, the critical resources of the Mobile Host 14 are exposed via its wireless bus interface. Because the respective wireless bus interfaces connect directly via the front-side bus of the computing devices, such resources are made available once the connection is established and the credentials of the computing devices are verified.

It is noted that, while known technologies now permit certain connectivity among computing devices, they cannot achieve the advantages of the invention. For example, known server technology permits users to "hot plug" additional processors via the front-side bus. However, this feature only provides additional processing power to the server of interest. Current docking station and replicator technologies similarly fail to provide the advantages of the present invention as they, at most, interconnect with the Southbridge circuitry of the docked and docking systems. Therefore, the latter technologies cannot provide sharing of critical resources of the respective computing devices.

Figure 6:
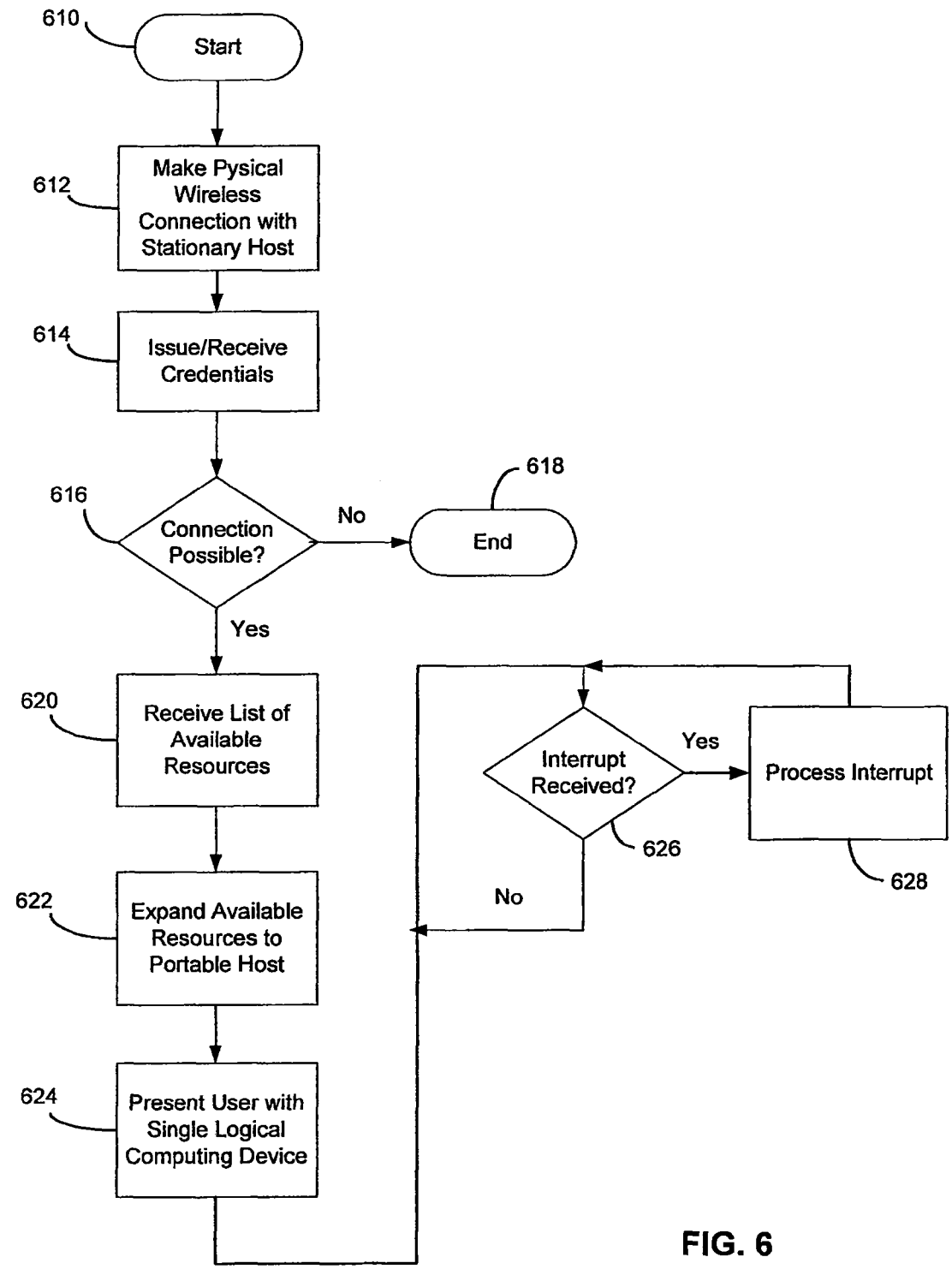
FIG. 6 illustrates a flow chart corresponding to a process of authorizing and performing a wireless connection according to an embodiment of the invention.

FIG. 6 illustrates a process for forming a high-speed wireless connection from the standpoint of a mobile host that attempts to establish a connection with a stationary host. For clarity, FIG. 6 focuses on the aspects of an embodiment of the invention and omits certain details that are familiar to those of skill in the art.

In step 610 of the flow chart, a computing device, such as the mobile host computing device 14 shown in FIG. 1, begins at step 610 and proceeds to a step 612 when the computing device 14 detects that one or more other UWB-enabled computing devices are within its transmission range. This detection can be performed by any suitable connection module as will be understood by those skilled in the art. In this step, the mobile computing device 14 establishes a physical wireless connection with the one or more other detected computing devices, in this case the stationary host computing device 12. Once a wireless connection is established, the mobile host computing device 14 determines whether connectivity via a high-speed wireless bus may occur with the stationary host device in a step 614. For performing this step, the mobile host device 14 issues its credentials. Similarly, the mobile host 14 receives credentials from the stationary host concerning the availability of a connection. Based on the credentials exchanged between the computing devices, the method then proceeds to a step 616 and determines whether a connection may be established. If not, the method ends at a step 618.

On the other hand, if the mobile host determines that a connection may be established during the step 616, the method proceeds to a next step 620 and receives a list of available resources from the stationary host 12. At a next step 622, the mobile host 14 expands the available resources to the system. This may include, among other things, allocation of additional volatile memory, extension of a logical disk or non-volatile memory, and use of a second processor. As a result of the allocation of available resources, the mobile host device 14 presents the user with a single logical computing entity with the combined resources of the mobile host and the stationary host, as shown by a step 624. That is, the mobile host device would appear to the user as including all available resources of both physical devices.

In a preferred embodiment, the operating system of the mobile host device 14 undertakes control of the available resources and performs an assignment of tasks for the resources. In this embodiment, the resources assigned to created logical entity function under the control of a single operating system.

During operation of the single logical host device, the mobile host device 14 may receive interrupt requests from the stationary host 12 as shown at a step 626. If an interrupt request is received, the method advances to a step 628 and services the request. This may include, among other things, reconfiguring the logical unit in the event that certain resources become unavailable. The operating system running on the mobile host handles such requests in a logical fashion so that no perceptible impact is experienced by the user. The method then continues until other interrupt requests are issued. Similarly, the mobile host device may issue interrupt requests to the stationary host device when, for example, a change in resource status occurs.

Figure 7:
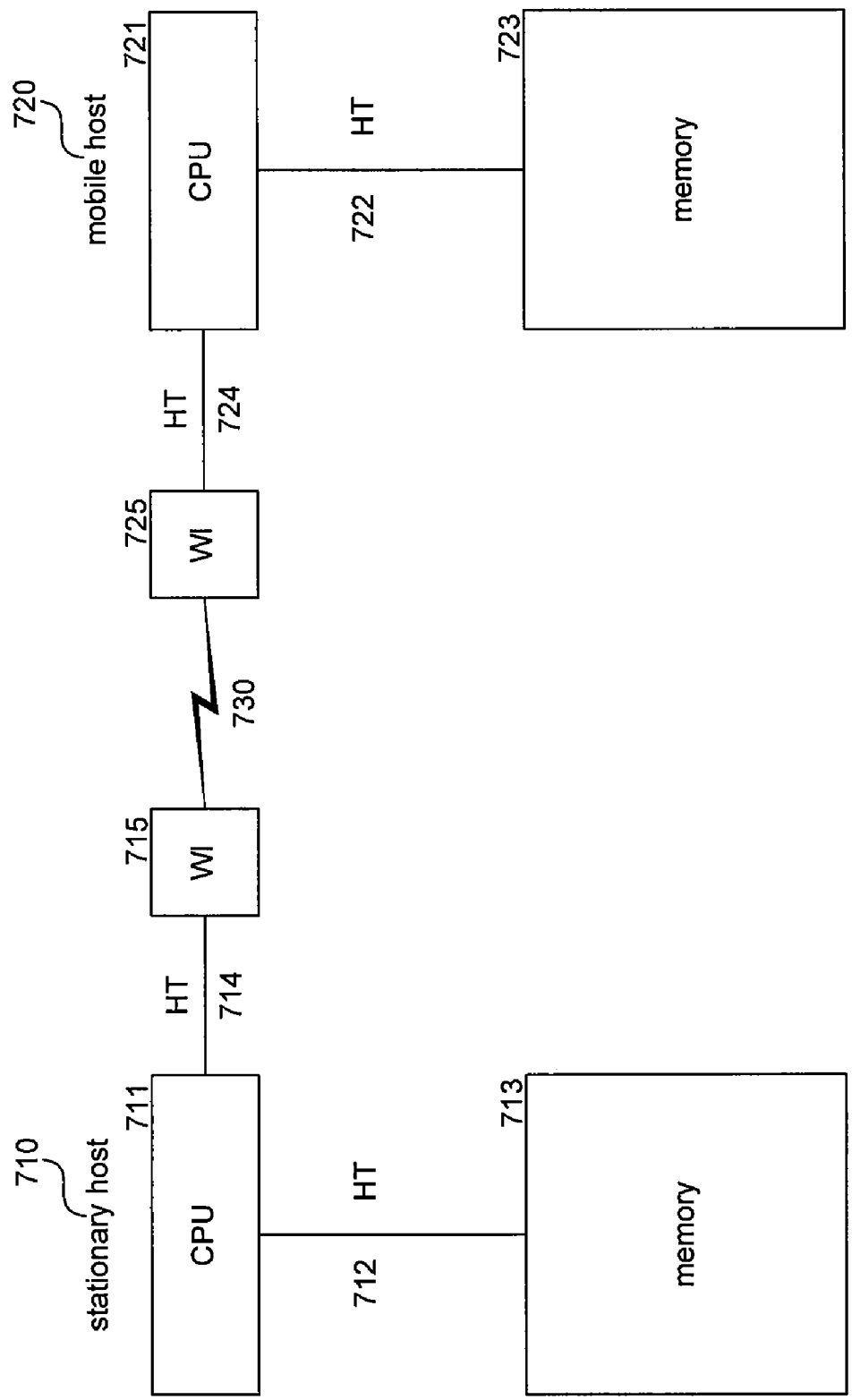
FIG. 7 is a schematic diagram illustrating a high-speed wireless connection between hosts that use HyperTransport™ technology.

FIG. 7 is a schematic diagram illustrating a high-speed wireless connection between hosts that use HyperTransport™ technology. Some CPUs, such as the AMD Opteron™ processor, communicate with memory and other devices using HyperTransport™ technology. Such processors may include multiple HyperTransport™ ports. Packets received on one port are either consumed by the processor or routed through another port. A stationary host 710 may include a CPU 711 that is connected to a memory module 713 via a HyperTransport™ link 712. The CPU is also connected to wireless interface 715 via a HyperTransport™ link 714. A mobile host 720 may similarly include a CPU 721 that is connected to a memory module 723 via a HyperTransport™ link 722. The CPU is also connected to wireless interface 725 via a HyperTransport™ link 724. The wireless interfaces 715 and 725 are connected via a wireless link 730. When the stationary host and mobile host detect that they are in proximity, a wireless connection is established between the stationary host and the mobile host via the wireless link 730. The CPU of each host can send HyperTransport™ packets via the wireless link to the CPU of the other host or the memory of the other host. The wireless interface of a host receives HyperTransport™ packets from the CPU of the host via a HyperTransport™ link, and converts and transmits the packets over the wireless link to the other host. The wireless interface of a host also receives packets from the CPU of another host, and converts and transmits the packets to the CPU of the host over a HyperTransport™ link. A CPU that receives a packet from the CPU of another host may consume the packet or forward the packet to the memory device of the host. Thus, the stationary host can access to the memory module of the mobile host, and the mobile host can access the memory module of the stationary host.

Figure 8:
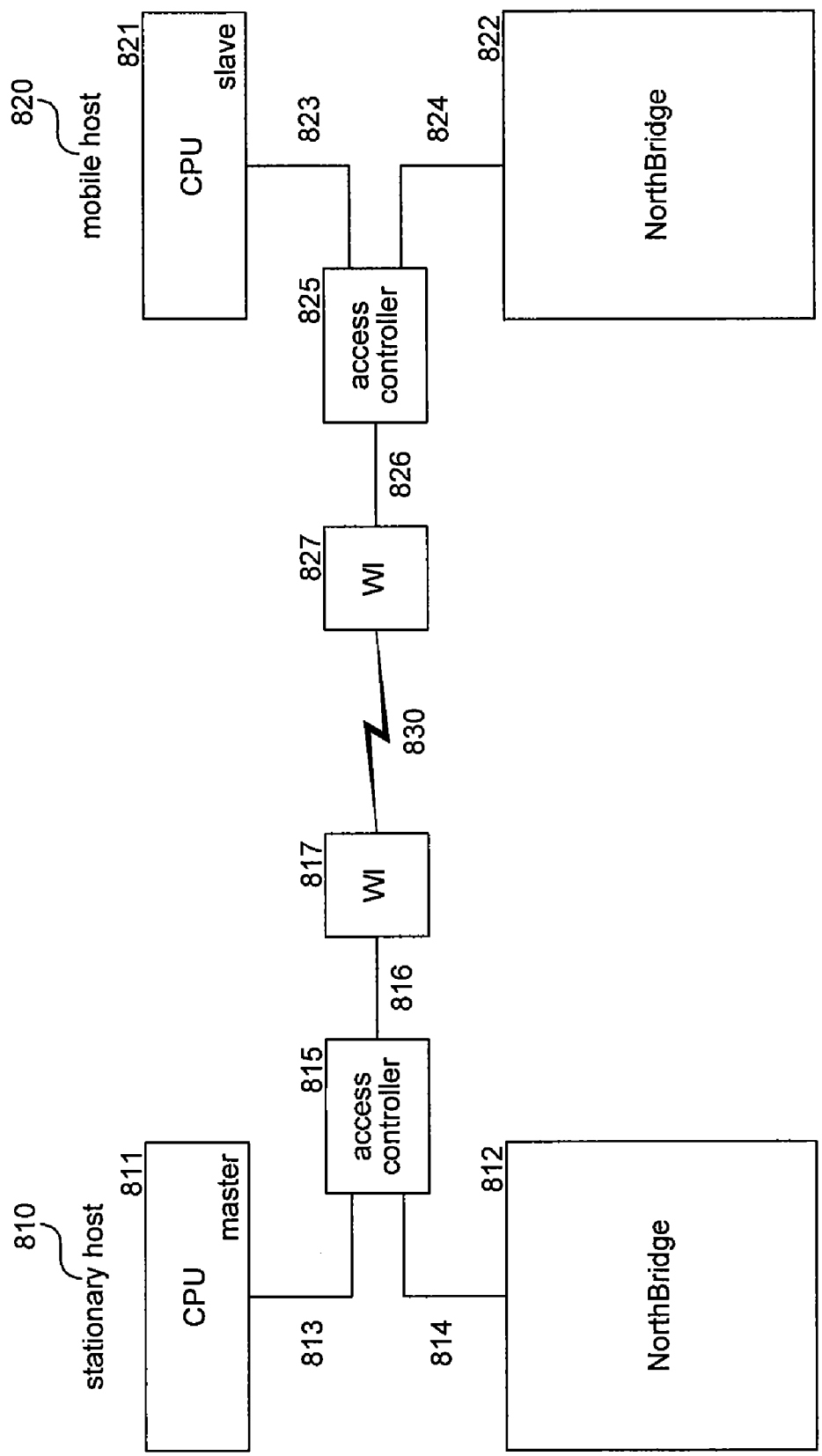
FIG. 8 is a schematic diagram illustrating a high-speed wireless connection between hosts each with a front-side bus connected to its NorthBridge.

FIG. 8 is a schematic diagram illustrating a high-speed wireless connection between hosts each with a front-side bus connected to its NorthBridge. A stationary host 810 may include a CPU 811 that is connected to an access controller 815 via a first portion 813 of the front-side bus. The access controller 815 is connected to a NorthBridge 812 via a second portion 814 of the front-side bus. The access controller 815 is also connected to a wireless interface 817 via a link 816. A mobile host 820 similarly may include a CPU 821 that is connected to an access controller 825 via a first portion 823 of the front-side bus. The access controller 825 is connected to a NorthBridge 822 via a second portion 824 of the front-side bus. The access controller 825 is also connected to a wireless interface 827 via a link 826. The wireless interfaces 817 and 827 are connected via wireless a communications link 830. Each access control receives communications from its CPU via the first portion of its front-side bus. The access controller sends the communications to either its NorthBridge via the second portion of its front-side bus the other host via the wireless link. Each access controller also receives communications from its NorthBridge via the second portion of its front-side bus and sends the communications to either its CPU via the first portion of the front-side bus or the other host via the wireless link. Each access controller also receives communications from the other host via the wireless link and sends the communication to either its CPU via the first portion of its front-side bus or its memory via the second portion of the front-side bus. The access controllers may coordinate access to memory to prevent memory access conflicts and to help ensure consistency between the memory caches of the CPUs and the main memory. The access controllers may have functionality similar to that incorporated into the INTEL E8500 Chipset North Bridge with multiple front-side bus ports. The operating systems executing on the stationary host and the mobile host may be based on a peer architecture or a master/slave architecture. With a peer architecture, the operating systems work cooperatively to access memory and other resources of the hosts. With a master/slave architecture, the operating system of the master controls access to the resources of both host.

Figure 9:
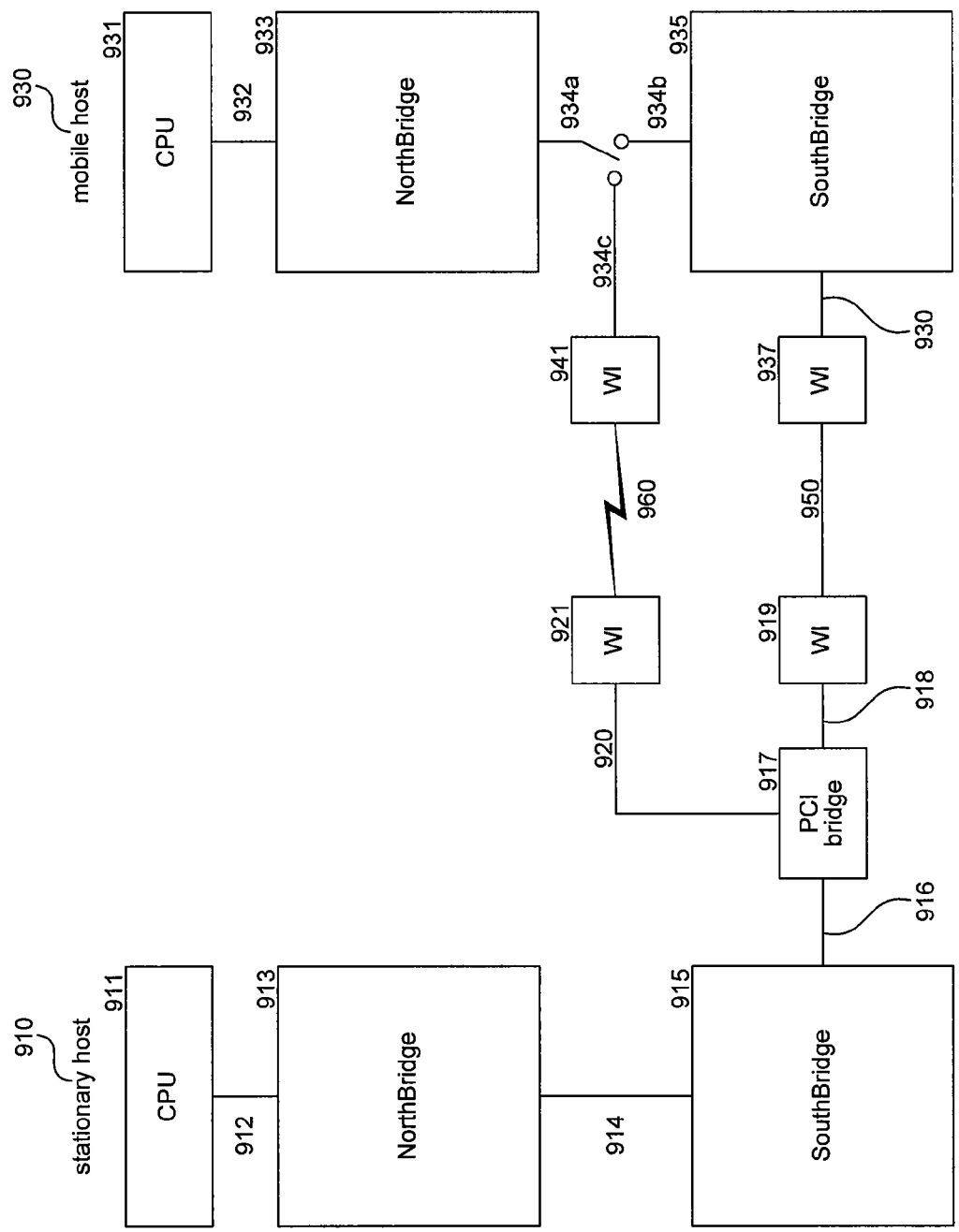
FIG. 9 is a schematic diagram illustrating a high-speed wireless connection between the SouthBridges of hosts.

FIG. 9 is a schematic diagram illustrating a high-speed wireless connection between the SouthBridges of hosts. The wireless connection between the SouthBridges allows the peripheral devices attached to the SouthBridges to be shared, but not the memory connected to the NorthBridge. A stationary host 910 may include a CPU 911 that is connected to a NorthBridge 913 via a front-side bus 912. The NorthBridge 913 is connected to a SouthBridge 915 via a back-side bus 914. The SouthBridge 915 is connected to a PCI Bridge 917 via a link 916. The PCI Bridge 917 is connected to a wireless interface 919 via a link 918 and optionally connected to a wireless interface 921 via a link 920. A mobile host 930 may include a CPU 931 connected to a NorthBridge 933 via a front-side bus 932. The NorthBridge 933 may optionally not be connected to a SouthBridge 935, connected to the SouthBridge, or connected to a wireless interface 941 via back-side bus portions 934*a*, 934*b*, and 934*c*. The SouthBridge 935 is connected to a wireless interface 937 via link 936. In this example, the stationary host includes the PCI Bridge 917 for interconnecting the SouthBridges. In normal operation, the NorthBridge 933 of the mobile host is connected to the SouthBridge 935 via the back-side bus 934*a* and 934*b*. When a wireless connection is established between the SouthBridges, the connection from 934*a* to 934*b* is broken. In this way, the stationary host can access the peripherals of the SouthBridge 934 of the mobile host without contention from the CPU of the mobile host. The NorthBridge 933 of the mobile host may be connected to the wireless interface 941 to the PCI Bridge 917 by connecting the back-side bus 934*a* and 934*c*. The PCI Bridge 917 coordinates access to the peripherals by the stationary host and the mobile host.

In an alternative embodiment of the invention, a high-speed wireless connection may be established among multiple computing devices. Also, multiple parallel wireless communication channels may be used to establish connectivity between computing devices.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best level known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of connecting a first computing device with a second computing device on a wireless network, the first computing device having a first central processing unit, a first memory, and a first front-side bus that connects the first central processing unit to the first memory, the second computing device having a second central processing unit, a second memory, and a second front-side bus that connects the second central processing unit to the second memory, the method comprising:

detecting at the first computing device the presence of the second computing device on the wireless network;

creating a wireless bridge between the first computing device and the second computing device, the wireless bridge including wireless interfaces for under control of a first access controller of the first computing device, the first access controller being directly connected to the first front-side bus, receiving communications placed on the first front-side bus;
transmitting the received communications via the wireless network to the second computing device;
receiving communications transmitted via the wireless network from the second computing device; and
placing the received communications onto the first front-side bus; and
under control of a second access controller of the second computing device, the second access controller being directly connected to the second front-side bus,
receiving communications transmitted via the wireless network from the first computing device;
placing the received communications onto the second front-side bus;
receiving communications placed on second front-side bus; and
transmitting the received communications via the wireless network to the first computing device; and
permitting access by the first computing device to critical resources of the second computing device by sending communications between the first computing device and the second computing device via the wireless bridge.

2. The method according to claim 1, wherein the wireless network is an Ultra Wideband (UWB) network.

3. The method according to claim 1 further including the step of
creating by the first computing device a single logical computing entity from the resources of the first computing device and the critical resources of the second computing device.

4. The method according to claim 3 wherein the critical resources of the second computing device include one or more of the central processing unit, volatile memory and non-volatile memory of the second computing device.

5. The method according to claim 4, wherein the step of permitting access by the first computing device includes issuing credentials by the first computing device to the second computing device.

6. The method according to claim 1 further including the step of
receiving by the first computing device a list of available critical resources from the second computing device.

7. The method according to claim 6 further including the step of
creating by the first computing device a single logical computing entity from the resources of the first computing device and the critical resources of the second computing device.

8. The method according to claim 7 wherein the first computing device manages the critical resources of the second computing device.

9. The method according to claim 7 further including the steps of
receiving by the first computing device an interrupt request from the second computing device; and
terminating the high-speed wireless bridge between the first computing device and the second computing device.

10. A computer-readable storage medium having thereon computer-executable instructions for performing a method of connecting a first computing device with a second computing device on a wireless network, the instructions including instructions for:
detecting at the first computing device the presence of the second computing device on the wireless network, the first computing device having a first front-side bus and the second computing device having a second front-side bus;
creating a wireless bridge between the first computing device and the second computing device, the wireless bridge including wireless interfaces for:
receiving communications placed on the first front-side bus and transmitting the received communications via the wireless network to be placed on the second front-side bus and for
receiving via the wireless network communications placed on the second front-side bus and placing the received communications onto the front-side bus, wherein the first front-side bus of the first computing device is connected to an access controller for controlling communications placed onto the first front-side bus;
permitting access by the first computing device to resources of the second computing device; and
creating by the first computing device a single logical computing entity from the resources of the first computing device and the resources of the second computing device.

11. The computer-readable storage medium according to claim 10, wherein the wireless network is an Ultra Wideband (UWB) network.

12. The computer-readable storage medium according to claim 11, wherein the resources of the second computing device include one or more of the central processing unit, volatile memory and non-volatile memory of the second computing device.

13. The computer-readable storage medium according to claim 12, including instructions for receiving by the first computing device a list of available critical resources from the second computing device.

14. A mobile computing device comprising:
a central processing unit;
a first front-side bus coupling the central processing unit with a first front-side bus port of a NorthBridge;
a wireless interface for receiving first communications placed on the first front-side bus and transmitting the received first communications via a wireless network to a second computing device for placement on a second front-side bus of the second computing device and for receiving second communications transmitted via the wireless network that were placed on the second front-side bus of the second computing device and placing the received second communications onto the first front-side bus, the second communications being responsive to the first communications; and
a component that establishes a high-speed wireless communication link between the central processing unit and critical computing resources of the second computing device via the wireless network so that the first communications of the mobile computing device are processed by the second computing device and the second computing device responds to the first communications with the second communications.

15. The mobile computing device of claim 14 wherein the critical resources of the second computing device include a central processing unit, non-volatile memory and volatile memory.

16. The mobile computing device of claim 14 further comprising:
means for determining a set of available resources from said another computing device; and means for creating a single logical computing entity from the mobile computing device resources and the critical resources of said second computing device.

17. The mobile computing device of claim 16 wherein the wireless network includes an Ultra Wideband (UWB) network.

18. The mobile computing device of claim 14 further comprising:
   means responsive to the means for establishing, for obtaining a list of available resources from the second computing device.

19. The mobile computing device of claim 14 further comprising:
   means for managing the critical resources of the second computing device.

20. The mobile computing device of claim 14 further comprising:
   means for establishing a high-speed wireless communication link between the central processing unit and critical computing resources of a third computing device via the front-side bus.

* * * * *